United States Patent
Sakamoto et al.

(10) Patent No.: US 11,214,043 B2
(45) Date of Patent: Jan. 4, 2022

(54) INTERMEDIATE FILM FOR LAMINATED GLASS, AND LAMINATED GLASS

(71) Applicant: SEKISUI CHEMICAL CO., LTD., Osaka (JP)

(72) Inventors: Yuu Sakamoto, Kouka (JP); Tatsuya Iwamoto, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/613,006

(22) PCT Filed: May 18, 2018

(86) PCT No.: PCT/JP2018/019313
§ 371 (c)(1),
(2) Date: Nov. 12, 2019

(87) PCT Pub. No.: WO2018/212331
PCT Pub. Date: Nov. 22, 2018

(65) Prior Publication Data
US 2020/0171798 A1 Jun. 4, 2020

(30) Foreign Application Priority Data
May 19, 2017 (JP) .............................. JP2017-099867

(51) Int. Cl.
*B32B 17/10* (2006.01)
*B32B 27/22* (2006.01)
*B32B 27/32* (2006.01)

(52) U.S. Cl.
CPC .... *B32B 17/1055* (2013.01); *B32B 17/10036* (2013.01); *B32B 17/10605* (2013.01);
(Continued)

(58) Field of Classification Search
None
See application file for complete search history.

(56) References Cited

U.S. PATENT DOCUMENTS 3,532,590 A 10/1970 Priddle
3,762,988 A 10/1973 Clock et al.
(Continued)

FOREIGN PATENT DOCUMENTS

CN 101331179 A 12/2008
CN 101341198 A 1/2009
(Continued)

OTHER PUBLICATIONS

Written Opinion of the International Searching Authority (PCT/ISA/237) for Application No. PCT/JP2018/019313 dated Jul. 17, 2018 (English Translation mailed Nov. 28, 2019).
(Continued)

*Primary Examiner* — Ramsey Zacharia
(74) *Attorney, Agent, or Firm* — Cheng Law Group, PLLC

(57) ABSTRACT

Provided is an interlayer film for laminated glass capable of effectively enhancing the sound insulating property of laminated glass having the interlayer film, in the interlayer film including a layer prepared with a thermoplastic component other than a polyvinyl acetal resin. An interlayer film for laminated glass according to the present invention has a one-layer structure or a two or more-layer structure, and includes a thermoplastic elastomer layer containing a thermoplastic elastomer and a plasticizer, and the thermoplastic elastomer is an aliphatic polyolefin, the thermoplastic elastomer layer has a glass transition temperature in a temperature range of −10° C. to 10° C., and a maximum value of tan δ in a temperature range of −10° C. to 10° C. of the thermoplastic elastomer layer is 1.5 or more.

10 Claims, 2 Drawing Sheets

(52) U.S. Cl.
CPC .............. *B32B 27/22* (2013.01); *B32B 27/32* (2013.01); *B32B 2274/00* (2013.01)

(56) References Cited

U.S. PATENT DOCUMENTS

| | | |
|---|---|---|
| 7,619,027 B2 | 11/2009 | Chapman et al. |
| 8,900,691 B2 | 12/2014 | Rehfeld et al. |
| 9,102,122 B2 | 8/2015 | Rehfeld et al. |
| 2007/0100060 A1 | 5/2007 | Tahri et al. |
| 2008/0176969 A1 | 7/2008 | Tahri et al. |
| 2009/0012227 A1 | 1/2009 | Wang et al. |
| 2009/0209670 A1 | 8/2009 | Kanae et al. |
| 2012/0202070 A1 | 8/2012 | Asanuma et al. |
| 2012/0204940 A1 | 8/2012 | Asanuma et al. |
| 2012/0220728 A1 | 8/2012 | Uekusa et al. |
| 2013/0316158 A1 | 11/2013 | Rehfeld et al. |
| 2015/0030860 A1 | 1/2015 | Shimamoto et al. |
| 2015/0158986 A1 | 6/2015 | Xu et al. |
| 2015/0239996 A1 | 8/2015 | Funaya et al. |
| 2015/0258751 A1 | 9/2015 | Shimamoto et al. |
| 2016/0376385 A1 | 12/2016 | Funaya et al. |
| 2017/0028687 A1 | 2/2017 | DeRosa et al. |
| 2017/0298160 A1 | 10/2017 | Uekusa et al. |
| 2017/0327610 A1 | 11/2017 | Funaya et al. |
| 2017/0327611 A1 | 11/2017 | Funaya et al. |
| 2017/0334173 A1 | 11/2017 | Yui et al. |
| 2017/0361575 A1 | 12/2017 | Kusudou et al. |
| 2018/0001598 A1 | 1/2018 | Mikayama et al. |
| 2018/0001599 A1 | 1/2018 | Mikayama et al. |
| 2018/0079179 A1 | 3/2018 | Rehfeld et al. |
| 2018/0104931 A1 | 4/2018 | Asanuma et al. |
| 2018/0171057 A1 | 6/2018 | Koide et al. |
| 2018/0290436 A1 | 10/2018 | Yui et al. |
| 2018/0290437 A1 | 10/2018 | Kobayashi et al. |
| 2018/0290439 A1 | 10/2018 | Kusudou et al. |
| 2019/0375196 A1 | 12/2019 | Yui et al. |

FOREIGN PATENT DOCUMENTS

| | | |
|---|---|---|
| CN | 104662050 A | 5/2015 |
| EP | 2 287 125 A1 | 2/2011 |
| EP | 2 803 648 A1 | 11/2014 |
| EP | 3 219 686 A1 | 9/2017 |
| EP | 3 239 181 A1 | 11/2017 |
| EP | 3 275 934 A1 | 1/2018 |
| JP | 2007-70200 A | 3/2007 |
| JP | 2008-208003 A | 9/2008 |
| JP | 2015-525185 A | 9/2015 |
| JP | 2016-108225 A | 6/2016 |
| JP | 2017-502117 A | 1/2017 |
| WO | WO-2011/016494 A1 | 2/2011 |
| WO | WO-2011/055803 A1 | 5/2011 |
| WO | WO-2013/105657 A1 | 7/2013 |
| WO | WO-2014/069593 A1 | 5/2014 |
| WO | WO-2016/076336 A1 | 5/2016 |
| WO | WO-2016/076339 A1 | 5/2016 |
| WO | WO-2016/076340 A1 | 5/2016 |
| WO | WO-2016/104740 A1 | 6/2016 |
| WO | WO-2016/158695 A1 | 10/2016 |
| WO | WO-2016/158882 A1 | 10/2016 |

OTHER PUBLICATIONS

Written Opinion of the International Searching Authority (PCT/ISA/237) for Application No. PCT/JP2018/019314 dated Jul. 17, 2018 (English translation mailed Nov. 28, 2019).
International Search Report for the Application No. PCT/JP2018/019313 dated Jul. 17, 2018.
International Search Report for the Application No. PCT/JP2018/019314 dated Jul. 17, 2018.
Carrot, Christian et al., "Polyvinyl Butyral", Handbook of Thermoplastics, 2015, pp. 89-137.
Novotný, M. et al., "Influence of Temperature on Laminated Glass Performances Assembled with Various Interlayers", Challenging Glass 5-Conference on Architectural and Structural Applications of Glass, Belis, Bos & Louter (Eds.), Ghent University, 2016, pp. 1-14.
Non-Final Office Action for the U.S. Appl. No. 16/613,071 from United States Patent and Trademark Office dated Nov. 10, 2020.
Supplementary European Search Report for the Application No. EP 18 801 428.6 dated Feb. 2, 2021.
Supplementary European Search Report for the Application No. EP 18 801 901.2 dated Feb. 5, 2021.
Examination Report for Application No. 201947046347 from Intellectual Property India Patent Office dated Jan. 28, 2021.
Final Office Action for the U.S. Appl. No. 16/613,071 from United States Patent and Trademark Office dated Jun. 28, 2021.
"Pharmaceutical Polymer Material Science", Chapter 7 Polymer Material for Pharmaceutical Packaging 255, Chief Editor; Zheng Junmin, China Medical Science and Technology Press, 3$^{rd}$ Edition, Jan. 2009.

[FIG. 1]
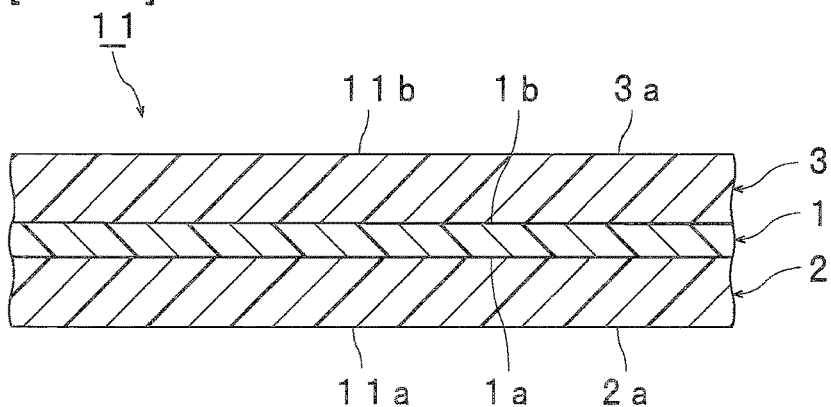
[FIG. 2]
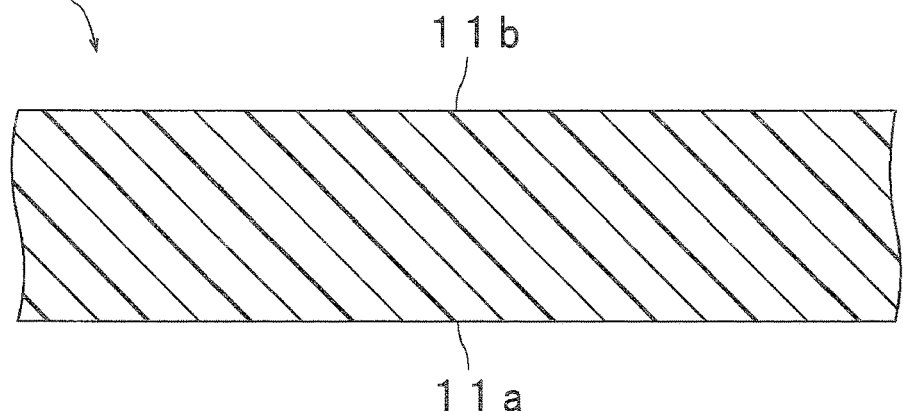
[FIG. 3]
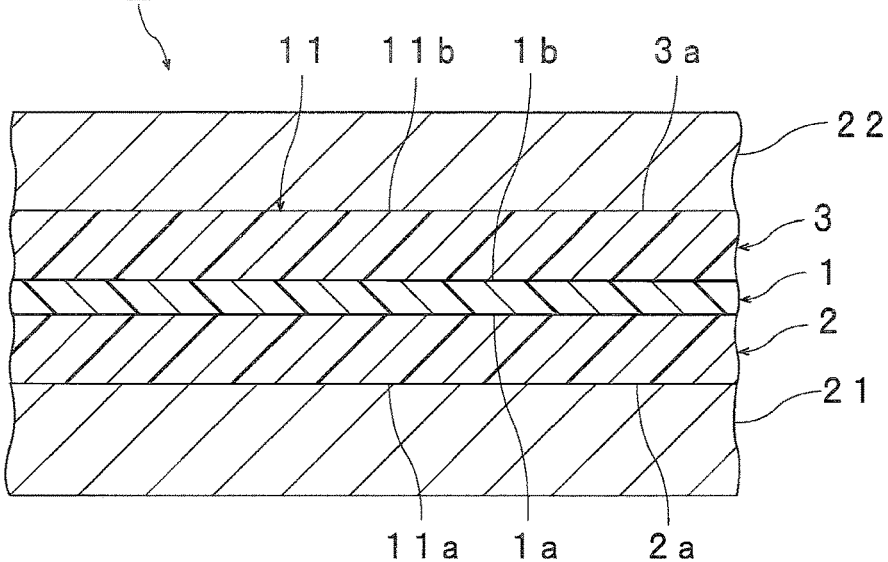

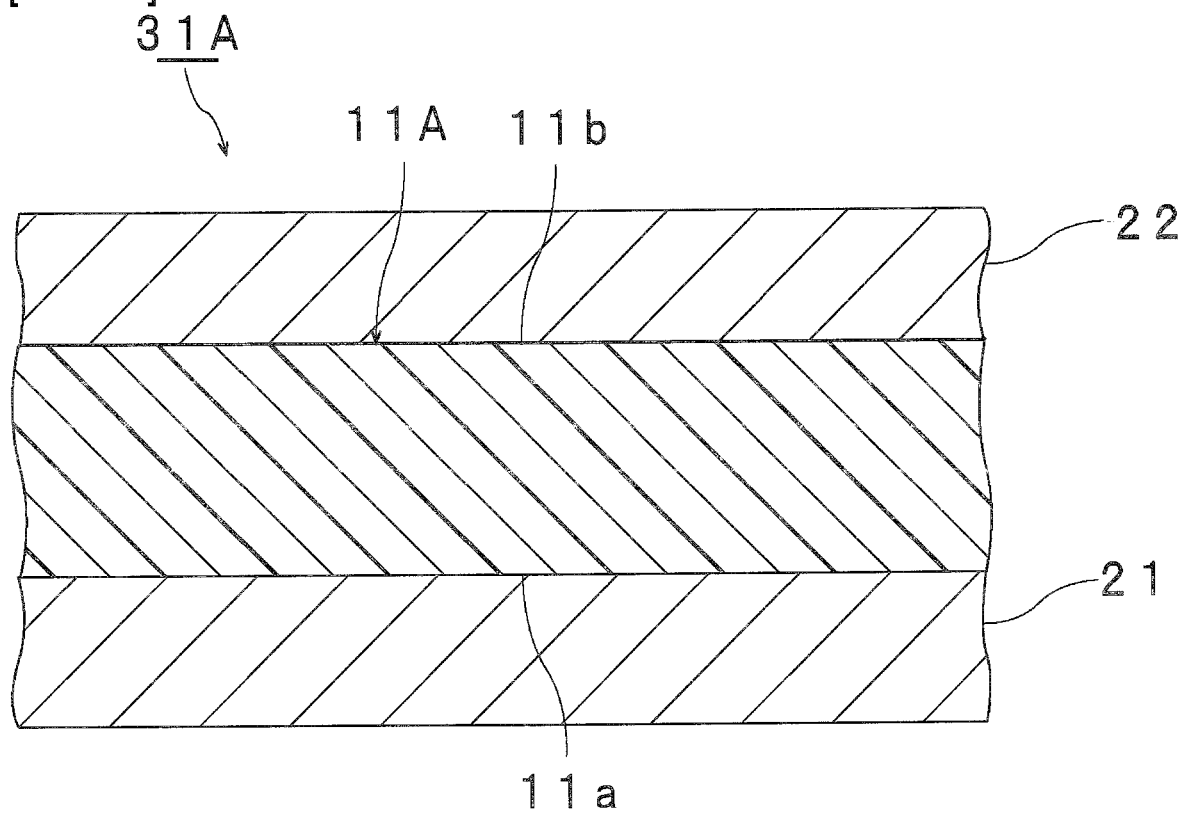

INTERMEDIATE FILM FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

Examples of the interlayer film for laminated glass include a single-layered interlayer film having a one-layer structure and a multi-layered interlayer film having a two or more-layer structure.

The following Patent Document 1 discloses a sound insulating layer containing 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and more than 30 parts by weight of a plasticizer. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer contains 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of 30 parts by weight or less.

The following Patent Document 2 discloses an interlayer film in which a layer containing polyvinyl acetal and a layer containing polyolefin are layered.

The following Patent Document 3 discloses a composition containing 4-methyl-1-pentene-α-olefin copolymer, and 4-methyl-1-pentene copolymer composition. In the paragraph [0284] of Patent Document 3, as films, sheets, and tapes prepared with the aforementioned composition, the following are recited: a mold release film for flexible print substrate, a mold release film for rigid substrate, a mold release film for rigid flexible substrate, a mold release film for advanced composite material, a mold release film for carbon fiber composite material hardening, a mold release film for glass fiber composite material hardening, a mold release film for aramid fiber composite material hardening, a mold release film for nano composite material hardening, a mold release film for filler hardening, a mold release film for semiconductor sealing, a mold release film for polarizing plate, a mold release film for diffusion sheet, a mold release film for prism sheet, a mold release film for reflection sheet, a cushion film for mold release film, a mold release film for fuel battery, a mold release film for various rubber sheets, a mold release film for urethane hardening, a mold release film for epoxy hardening, a solar battery cell sealing sheet, a solar battery cell back sheet, a plastic film for solar battery, a battery separator, a separator for lithium ion battery, a electrolytic film for fuel battery, a pressure-sensitive adhesive or adhesive material separator, a dicing tape, a backgrind tape, a die bonding film, a double-layer FCCL, a film for film capacitor, a pressure-sensitive adhesive film, a film for pellicle, a film for polarizing plate, a protective film for polarizing plate, a protective film for liquid crystal panel, a protective film for optical component, a protective film for lens, a protective film for electric component or electric appliance, a protective film for cellular phone, a protective film for PC, a masking film, a film for capacitor, a reflection film, a laminate (including glass), a radiation resistance film, a γ-ray resistance film, a porous film, a heat dissipation film or sheet, a mold for producing a sealed electronic component, a LED mold, a laminate plate for high-frequency circuit, a covering material for high-frequency cable, an optical waveguide substrate, a glass interlayer film, a film for laminated glass, a bulletproof material, a film for bulletproof glass, separate paper for synthetic leather, separate paper for advanced composite material, separate paper for carbon fiber composite material hardening, separate paper for glass fiber composite material hardening, separate paper for aramid fiber composite material hardening, separate paper for nano composite material hardening, separate paper for filler hardening, and heat-resistant and water-resistant developing paper. This list includes a glass interlayer film, and a film for laminated glass.

RELATED ART DOCUMENT

Patent Documents

Patent Document 1: JP 2007-070200 A
Patent Document 2: WO 2011/016494 A1
Patent Document 3: WO 2011/055803 A

SUMMARY OF THE INVENTION

Problems to be Solved by the Invention

In the interlayer film described in Patent Document 1, since a specific sound insulating layer containing a polyvinyl acetal resin, and a plasticizer or the like is provided, it is possible to enhance the sound insulating property to some extent.

On the other hand, as described in Patent Document 2, an interlayer film having a layer prepared with a thermoplastic component other than a polyvinyl acetal resin is known. However, in laminated glass using this interlayer film, the sound insulating property cannot be sufficiently high. There is sometimes the case that the sound insulating property is not sufficiently high neither a film using a composition containing 4-methyl-1-pentene-α-olefin copolymer nor a film using a 4-methyl-1-pentene copolymer composition as described in Patent Document 3.

The present invention aims at providing an interlayer film for laminated glass capable of effectively enhancing the sound insulating property of laminated glass having an interlayer film including a layer prepared with a thermoplastic component other than a polyvinyl acetal resin. Moreover, the present invention also aims at providing laminated glass prepared with the interlayer film for laminated glass.

Means for Solving the Problems

The present inventors investigated for enhancing the sound insulating property of laminated glass in an interlayer film including a layer prepared with a thermoplastic component other than a polyvinyl acetal resin. Then, the present inventors found a configuration capable of enhancing the sound insulating property of laminated glass in an interlayer film including a layer prepared with a thermoplastic component other than a polyvinyl acetal resin.

According to a broad aspect of the present invention, there is provided an interlayer film for laminated glass (hereinafter, sometimes described as interlayer film) having a one-layer structure or a two or more-layer structure, the interlayer film including a thermoplastic elastomer layer containing a thermoplastic elastomer and a plasticizer, the thermoplastic elastomer being an aliphatic polyolefin, the thermoplastic elastomer layer having a glass transition temperature in a temperature range of −10° C. to 10° C., a maximum value of tan δ in a temperature range of −10° C. to 10° C. of the thermoplastic elastomer layer being 1.5 or more.

In a specific aspect of the interlayer film according to the present invention, the aliphatic polyolefin is a saturated aliphatic polyolefin.

In a specific aspect of the interlayer film according to the present invention, the plasticizer is a plasticizer other than an organic ester plasticizer.

In a specific aspect of the interlayer film according to the present invention, the plasticizer is paraffin oil.

In a specific aspect of the interlayer film according to the present invention, the interlayer film includes a first layer, and a second layer arranged on a first surface side of the first layer, the first layer being the thermoplastic elastomer layer.

In a specific aspect of the interlayer film according to the present invention, the interlayer film includes a third layer arranged on a second surface side opposite to the first surface side of the first layer.

In a specific aspect of the interlayer film according to the present invention, the second layer contains a thermoplastic resin and a plasticizer, and the third layer contains a thermoplastic resin and a plasticizer.

In a broad aspect of the present invention, there is provided a laminated glass including a first lamination glass member, a second lamination glass member and the interlayer film for laminated glass described above, the interlayer film for laminated glass being arranged between the first lamination glass member and the second lamination glass member.

Effect of the Invention

The interlayer film for laminated glass according to the present invention is an interlayer film for laminated glass having a one-layer structure or a two or more-layer structure, and includes a thermoplastic elastomer layer containing a thermoplastic elastomer and a plasticizer. In the interlayer film for laminated glass according to the present invention, the thermoplastic elastomer is an aliphatic polyolefin, the thermoplastic elastomer layer has a glass transition temperature in a temperature range of −10° C. to 10° C., and a maximum value of tan δ in a temperature range of −10° C. to 10° C. of the thermoplastic elastomer layer is 1.5 or more. In the interlayer film for laminated glass according to the present invention, since the above-described configuration is provided, it is possible to effectively enhance the sound insulating property of laminated glass having an interlayer film including a layer prepared with a thermoplastic component other than a polyvinyl acetal resin.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

MODE(S) FOR CARRYING OUT THE INVENTION

Hereinafter, the present invention will be described in detail.
(Interlayer Film for Laminated Glass)

The interlayer film for laminated glass according to the present invention (hereinafter, sometimes described as interlayer film) has a one-layer structure or a two or more-layer structure.

The interlayer film according to the present invention includes a thermoplastic elastomer layer containing a thermoplastic elastomer and a plasticizer. The interlayer film according to the present invention includes a thermoplastic elastomer layer containing a thermoplastic elastomer as a thermoplastic resin other than a polyvinyl acetal resin.

In the interlayer film according to the present invention, the thermoplastic elastomer is an aliphatic polyolefin. In the interlayer film according to the present invention, the thermoplastic elastomer layer has a glass transition temperature in a temperature range of 10° C. to 10° C. In the interlayer film according to the present invention, a maximum value of tan δ in a temperature range of −10° C. to 10° C. of the thermoplastic elastomer layer is 1.5 or more. In the interlayer film according to the present invention, not only an aliphatic polyolefin is used as the thermoplastic elastomer in the thermoplastic elastomer layer, but also the glass transition temperature of the thermoplastic elastomer layer lies within a temperature range of −10° C. to 10° C., and a maximum value of tan δ in a temperature range of −10° C. to 10° C. of the thermoplastic elastomer layer is 1.5 or more.

In the present invention, since the above-described configuration is provided, it is possible to effectively enhance the sound insulating property of laminated glass having an interlayer film including a layer prepared with a thermoplastic component other than a polyvinyl acetal resin.

In the present invention, it is also important to satisfy the following configurations of (1) and (2) as well as using an aliphatic polyolefin as the thermoplastic elastomer in the thermoplastic elastomer layer so as to enhance the sound insulating property. (1) A glass transition temperature of the thermoplastic elastomer layer lies within a temperature range of −10° C. to 10° C. (2) A maximum value of tan δ in a temperature range of −10° C. to 10° C. of the thermoplastic elastomer layer is 1.5 or more.

In general, the glass transition temperature of the obtained layer can be adjusted, but the maximum value of tan δ tends to decrease by addition of a plasticizer to the thermoplastic elastomer. For enhancing the sound insulating performance of laminated gas, it is important to select a kind of the thermoplastic elastomer, and a kind and a blending amount of the plasticizer so that the maximum value of tan δ of the thermoplastic elastomer layer is not too low. The present inventors found that by using an aliphatic polyolefin as the thermoplastic elastomer, it is possible to obtain an interlayer film for laminated glass having high sound insulating property for which the above selection is easy.

From the viewpoint of effectively enhancing the sound insulating property, a maximum value of tan δ in a temperature range of −10° C. to 10° C. of the thermoplastic elastomer layer is preferably 2.0 or more, more preferably 2.5 or more.

As a method for measuring the glass transition point and tan δ, a method of measuring viscoelasticity by using "ARES-G2" available from TA Instruments directly after keeping the obtained interlayer film for 12 hours in an environment at room temperature of 23±2° C. and a humidity of 25±5% can be recited. It is preferred to use a parallel plate with a diameter of 8 mm as a jig, and measure the glass transition temperature and tan δ under the condition in which the temperature is decreased from 30° C. to −50° C. at a temperature decreasing rate of 3° C./minute and under the condition of a frequency of 1 Hz and a strain of 1%. For an interlayer film having a two or more-layer structure, the layers may be delaminated, and the glass transition temperature of the layer to be measured may be measured.

The interlayer film according to the present invention may have a one-layer structure and may have a two or more-layer structure. The interlayer film according to the present invention may have a two-layer structure, may have a three-layer structure, and may have a three or more-layer structure.

The interlayer film according to the present invention may have a one-layer structure of only a first layer. In this case, the first layer is the thermoplastic elastomer layer.

From the viewpoint of effectively enhancing the sound insulating property and adhesiveness between layers, the interlayer film according to the present invention may include a first layer, and a second layer arranged on a first surface side of the first layer. In this case, it is preferred that the first layer be the thermoplastic elastomer layer.

From the viewpoint of effectively enhancing the sound insulating property and adhesiveness between layers, the interlayer film according to the present invention may include a first layer, a second layer arranged on a first surface side of the first layer, and a third layer arranged on a second surface side opposite to the first surface side of the first layer. In this case, it is preferred that the first layer be the thermoplastic elastomer layer.

From the viewpoint of effectively enhancing the sound insulating property and adhesiveness between layers, it is preferred that the thermoplastic elastomer layer be not a surface layer in the interlayer film, and it is preferred that the thermoplastic elastomer layer be an intermediate layer. It is to be noted that the thermoplastic elastomer layer may be a surface layer in the interlayer film.

From the viewpoint of enhancing the transparency of the laminated glass, the visible light transmittance of the interlayer film is preferably 70% or more, more preferably 80% or more, further preferably 85% or more.

The visible light transmittance is measured at a wavelength ranging from 380 to 780 nm by using a spectrophotometer ("U-4100" available from Hitachi High-Tech Science Corporation) in conformity with JIS R3211:1998.

The visible light transmittance of the interlayer film may be measured while the interlayer film is arranged between two sheets of clear glass.

For enhancing the visible light transmittance, the interlayer film and the thermoplastic elastomer layer may not contain a coloring agent, or may not contain carbon black.

Hereinafter, specific embodiments of the present invention will be described with reference to the drawings.

FIG. 1 is a sectional view schematically showing an interlayer film for laminated glass in accordance with a first embodiment of the present invention.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 includes a first layer 1, a second layer 2 and a third layer 3. The second layer 2 is arranged on a first surface side 1a of the first layer 1 to be layered thereon. The third layer 3 is arranged on a second surface 1b side at the opposite side of the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

In the interlayer film 11, it is preferred that the first layer be the thermoplastic elastomer layer. The second layer 2 may be the thermoplastic elastomer layer, or the third layer 3 may be the thermoplastic elastomer layer.

In this connection, other layers may be arranged between the second layer 2 and the first layer 1 and between the first layer 1 and the third layer 3, respectively. It is preferred that the second layer 2 and the first layer 1, and the first layer 1 and the third layer 3 be directly layered. Examples of another layer include an adhesive layer, and a layer containing polyethylene terephthalate and the like.

FIG. 2 is a sectional view schematically showing an interlayer film for laminated glass in accordance with a second embodiment of the present invention.

An interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass.

In the interlayer film 11A, the interlayer film 11A per se is the thermoplastic elastomer layer.

Hereinafter, the details of the thermoplastic elastomer layer (which may be a first layer), the first layer, the second layer, and the third layer, and the details of each ingredient contained in the thermoplastic elastomer layer (which may be a first layer), the first layer, the second layer, and the third layer will be described.

(Thermoplastic Elastomer)

The thermoplastic elastomer layer contains a thermoplastic elastomer. The thermoplastic elastomer is one of thermoplastic resins. The thermoplastic elastomer in the thermoplastic elastomer layer is an aliphatic polyolefin. One kind of the aliphatic polyolefin may be used alone, and two or more kinds thereof may be used in combination.

In 100% by weight of the thermoplastic resin in the thermoplastic elastomer layer, the content of the thermoplastic elastomer is preferably 50% by weight or more, more preferably 60% by weight or more, further preferably 70% by weight or more, especially preferably 80% by weight or more, most preferably 90% by weight or more. The whole of thermoplastic resin in the thermoplastic elastomer layer may be the thermoplastic elastomer.

The thermoplastic resin means a resin that softens and exhibits plasticity when it is heated, and hardens when it is cooled to room temperature (25° C.). Among the thermoplastic resins, especially the thermoplastic elastomer means a resin that softens and exhibits plasticity when it is heated, and hardens to exhibits rubber elasticity when it is cooled to room temperature (25° C.).

The aliphatic polyolefin may be a saturated aliphatic polyolefin, or may be an unsaturated aliphatic polyolefin. From the viewpoint of effectively enhancing the storage stability and the sound insulating property of the interlayer film, it is preferred that the aliphatic polyolefin be a saturated aliphatic polyolefin.

Examples of the material for the aliphatic polyolefin include ethylene, propylene, 1-butene, trans-2-butene, cis-2-butene, 1-pentene, trans-2-pentene, cis-2-pentene, 1-hexene, trans-2-hexene, cis-2-hexene, trans-3-hexene, cis-3-hexene, 1-heptene, trans-2-heptene, cis-2-heptene, trans-3-heptene, cis-3-heptene, 1-octene, trans-2-octene, cis-2-octene trans-3-octene, cis-3-octene, trans-4-octene, cis-4-octene, 1-nonene, trans-2-nonene, cis-2-nonene, trans-3-nonene, cis-3-nonene, trans-4-nonene, cis-4-nonene, 1-decene, trans-2-decene, cis-2-decene, trans-3-decene, cis-3-decene, trans-4-decene, cis-4-decene, trans-5-decene, cis-5-decene, 4-methyl-1-pentene, and vinylcyclohexane.

From the viewpoint of effectively enhancing the sound insulating property, it is preferred that the aliphatic polyolefin have a chained hydrocarbon group on a side chain.

When the interlayer film has a multilayer structure, the aliphatic polyolefin may be a modified aliphatic polyolefin from the viewpoint of improving the interlayer adhesive strength. It is preferred that the modified aliphatic polyolefin have a carboxyl group, a carboxylic anhydride group, a hydroxyl group or an epoxy group or the like. The modified aliphatic polyolefin may have these groups on a side chain of the molecular chain, or on a terminus.

(Thermoplastic Resin (Other than Aliphatic Polyolefin))

From the viewpoint of effectively enhancing the adhesiveness between layers, the first layer may contain a thermoplastic resin other than aliphatic polyolefin (hereinafter, sometimes described as thermoplastic resin (1)), or may contain a polyvinyl acetal resin (hereinafter, sometimes described as polyvinyl acetal resin (1)). From the viewpoint of effectively enhancing the adhesiveness, it is preferred that the second layer contain a thermoplastic resin (hereinafter, sometimes described as thermoplastic resin (2)), it is more preferred that the second layer contain a thermoplastic resin other than aliphatic polyolefin, and it is further preferred that the second layer contain a polyvinyl acetal resin (hereinafter, sometimes described as polyvinyl acetal resin (2)). From the viewpoint of effectively enhancing the adhesiveness, it is preferred that the third layer contain a thermoplastic resin (hereinafter, sometimes described as thermoplastic resin (3)), it is more preferred that the third layer contain a thermoplastic resin other than aliphatic polyolefin, and it is further preferred that the third layer contain a polyvinyl acetal resin (hereinafter, sometimes described as polyvinyl acetal resin (3)).

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, a polyvinyl acetate resin, a polyester resin, and the like. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, even more preferably 1500 or more, further preferably 1600 or more, and is preferably 5000 or less, more preferably 4000 or less, further preferably 3500 or less, especially preferably 3000 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraidehyde, isobutyraldehyde, n-hexylaldehyde, or n-valeraldehyde, more preferably propionaldehyde, n-butyraldehyde, or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin is preferably 15% by mole or more, more preferably 18% by mole or more, and preferably 40% by mole or less, and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, and more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may also be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

The thermoplastic elastomer layer contains a plasticizer. One kind of the plasticizer in the thermoplastic elastomer may be used alone and two or more kinds thereof may be used in combination.

From the viewpoint of effectively enhancing the adhesiveness, it is preferred that the first layer contain a plasticizer. From the viewpoint of effectively enhancing the adhesiveness, it is preferred that the second layer contain a plasticizer (hereinafter, sometimes described as a plasticizer (2)). From the viewpoint of effectively enhancing the adhesiveness, it is preferred that the third layer contain a plasticizer (hereinafter, sometimes described as a plasticizer (3)). One kind of the plasticizer in these layers may be used alone, and two or more kinds thereof may be used in combination.

Examples of the plasticizer include paraffin oil, an organic ester plasticizer, and a phosphate plasticizer, and the like. Examples of the organic ester plasticizer include a monobasic organic acid ester, a polybasic organic acid ester, and the like. Examples of the phosphate plasticizer include an organic phosphate plasticizer and an organic phosphite plasticizer, and the like. It is preferred that the plasticizer be a liquid plasticizer.

Examples of the paraffin oil include naphthenic process oil, white mineral oil, mineral oil, paraffin wax, liquid paraffin, and the like.

Examples of commercially available paraffin oil include "Diana process oil PW-90" available from Idemitsu Kosan Co., Ltd., "Diana process oil PW-100" available from Idemitsu Kosan Co., Ltd., "Diana process oil PW-32" available from Idemitsu Kosan Co., Ltd., and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dibutyl maleate, bis(2-butoxyethyl) adipate, dibutyl adipate, diisobutyl adipate, 2,2-butoxyethoxyethyl adipate, benzoic acid glycol ester, adipic acid 1,3-butyleneglycol polyester, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, tributyl acetylcitrate, diethyl carbonate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic ester plasticizer include a diester plasticizer represented by the following structural formula (11).

[Chemical 1]

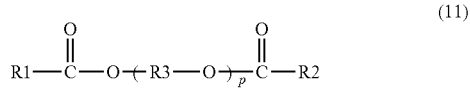
(11)

In the foregoing formula (11), R1 and R2 each represent an organic group with 5 to 10 carbon atoms, R3 represents an ethylene group, an isopropylene group or a n-propylene group, and p represents an integer of 3 to 10. It is preferred that R1 and R2 in the foregoing formula (11) each be an organic group with 6 to 10 carbon atoms.

Examples of the organic phosphate plasticizer include tributoxyethyl phosphate, isodecyl phenyl phosphate, triisopropyl phosphate, and the like.

Since an organic ester plasticizer is poor in plasticizing effect for aliphatic polyolefin, it is preferred that the plasticizer in the thermoplastic elastomer layer be a plasticizer other than an organic ester plasticizer. It is preferred that the plasticizer in the thermoplastic elastomer layer be a plasticizer other than an organic phosphate plasticizer.

From the viewpoint of effectively enhancing the sound insulating property, it is preferred that the plasticizer in the thermoplastic elastomer layer be paraffin oil.

From the viewpoint of effectively enhancing the adhesiveness, it is preferred that each of the plasticizer in the second layer and the plasticizer in the third layer be an organic ester plasticizer, and it is more preferred that each of the plasticizer in the second layer and the plasticizer in the third layer be a diester plasticizer represented by the above formula (11). From the viewpoint of effectively enhancing the adhesiveness, it is preferred that each of the plasticizers in the second layer and the third layer contain triethylene glycol di-2-ethylhexanoate (3GO) or triethylene glycol di-2-ethylbutyrate (3GH) and it is more preferred that each of the plasticizers in the second layer and the third layer contain triethylene glycol di-2-ethylhexanoate.

In the thermoplastic elastomer layer, the content (hereinafter, sometimes described as content (1)) of the plasticizer relative to 100 parts by weight of the thermoplastic elastomer (aliphatic polyolefin) is preferably 10 parts by weight or more, more preferably 20 parts by weight or more, and is preferably 60 parts by weight or less, more preferably 50 parts by weight or less, further preferably 40 parts by weight or less. When the content (1) is the above lower limit or more, it is possible to effectively enhance the sound insulating property. When the content (1) is the above upper limit or less, the penetration resistance of laminated glass is further enhanced.

In the second layer, the content of the plasticizer (2) relative to 100 parts by weight of the thermoplastic resin (2) is referred to as content (2). In the third layer, the content of the plasticizer (3) relative to 100 parts by weight of the thermoplastic resin (3) is referred to as content (3). Each of the content (2) and the content (3) is preferably 10 parts by weight or more, more preferably 15 parts by weight or more, further preferably 20 parts by weight or more, especially preferably 24 parts by weight or more, most preferably 25 parts by weight or more, and is preferably 45 parts by weight or less, more preferably 40 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

(Heat Shielding Substance)

It is preferred that the interlayer film contain a heat shielding substance (heat shielding compound). It is preferred that the thermoplastic elastomer layer contain a heat shielding substance. It is preferred that the first layer contain a heat shielding substance. It is preferred that the second layer contain a heat shielding substance. It is preferred that the third layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding compound may be constituted of both of the Ingredient X and the heat shielding particles.

Ingredient X:

It is preferred that the interlayer film include at least one kind of Ingredient X among a phthalocyanine compound, a naphthalocyanine compound, and an anthracyanine compound. It is preferred that the thermoplastic elastomer layer contain the Ingredient X. It is preferred that the first layer contain the Ingredient X. It is preferred that the second layer contain the Ingredient X. It is preferred that the third layer contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a thermoplastic elastomer layer, a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a thermoplastic elastomer layer, a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the thermoplastic elastomer layer contain heat shielding particles. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, the heat shielding particles are preferably metal oxide particles, more preferably ATO particles, GZO particles, IZO particles, ITO particles or tungsten oxide particles, and especially preferably ITO particles or tungsten oxide particles. In particular, since the heat ray shielding function is high and the particles are readily available, the heat shielding particles are preferably tin-doped indium oxide particles (ITO particles), and are also preferably tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, it is especially preferred that the metal-doped tungsten oxide particles be cesium-doped tungsten oxide particles. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a thermoplastic elastomer layer, a first layer, a second layer, or a third layer), each content of the heat shielding particles (in particular, the content of tungsten oxide particles) is preferably 0.01% by weight or more, more preferably 0.1% by weight or more, further preferably 1% by weight or more, especially preferably 1.5% by weight or more. In 100% by weight of the interlayer film or in 100% by weight of a layer containing the heat shielding particles, each content of the heat shielding particles (in particular, the content of tungsten oxide particles) is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

It is preferred that the interlayer film contain an alkali metal salt, an alkaline earth metal salt or a magnesium salt (hereinafter, these are sometimes described as Metal salt M). It is preferred that the thermoplastic elastomer layer contain metal salt M. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain as metal Li, Na, K, Rb, Cs, Mg, Ca, Sr or Ba. It is preferred that the metal salt included in the interlayer film contain a K salt or Mg salt.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

The magnesium carboxylate with 2 to 16 carbon atoms and the potassium carboxylate with 2 to 16 carbon atoms are not particularly limited. Examples of these include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a thermoplastic elastomer layer, a first layer, a second layer, or a third layer) is preferably 5 ppm or more, more preferably 10 ppm or more, and further preferably 20 ppm or more. The total of the contents of Mg and K in an interlayer film containing the Metal salt M or a layer containing the Metal salt M (a thermoplastic elastomer layer, a first layer, a second layer, or a third layer) is preferably 300 ppm or less, more preferably 250 ppm or less, further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film contain an ultraviolet ray screening agent. It is preferred that the thermoplastic elastomer layer contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a thermoplastic elastomer layer, a first layer, a second layer, or a third layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In 100% by weight of the interlayer film or in 100% by weight of a layer containing the ultraviolet ray screening agent (a thermoplastic elastomer layer, a first layer, a second layer, or a third layer), the content of the ultraviolet ray screening agent and the content of the benzotriazole compound are preferably 2.5% by weight or less, more preferably 2% by weight or less, further preferably 1% by weight or less, especially preferably 0.8% by weight or less. When the content of the ultraviolet ray screening agent and the content of the benzotriazole compound are the above lower limit or more and the above upper limit or less, deterioration in visible light transmittance after a lapse of a period can be further suppressed. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the thermoplastic elastomer layer contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a thermoplastic elastomer layer, a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the interlayer film, the thermoplastic elastomer layer, the first layer, the second layer, and the third layer may contain additives such as a coupling agent, a dispersing agent, a surfactant, a flame retardant, an antistatic agent, a pigment, a dye, an adhesive strength adjusting agent (other than metal salt) for between a lamination glass member and a layer being in contact with the lamination glass member, an interlayer adhesive strength adjusting agent (other than metal salt), a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film (thickness of the entire interlayer film) is referred to as T. The thickness of each of the thermoplastic elastomer layer and the first layer is preferably 0.035 T or more, more preferably 0.0625 T or more, further preferably 0.1 T or more and is preferably 0.4 T or less, more preferably 0.375 T or less, further preferably 0.25 T or less, particularly preferably 0.15 T or less. When the thickness of the thermoplastic elastomer layer and the first layer is 0.4 T or less, the flexural rigidity is further improved.

The thickness of each of the second layer and the third layer is preferably 0.3 T or more, more preferably 0.3125 T or more, further preferably 0.375 T or more and is preferably 0.97 T or less, more preferably 0.9375 T or less, further preferably 0.9 T or less. The thickness of each of the second layer and the third layer may be 0.46875 T or less, and may be 0.45 T or less. When the thickness of each of the second layer and the third layer is the above-described lower limit or more and the above-described upper limit or less, the rigidity and the sound insulating property of the laminated glass are further enhanced.

A total thickness of the second layer and the third layer is preferably 0.625 T or more, more preferably 0.75 T or more, further preferably 0.85 T or more and is preferably 0.97 T or less, more preferably 0.9375 T or less, further preferably 0.9 T or less. When the total thickness of the second layer and the third layer is the above-described lower limit or more and the above-described upper limit or less, the rigidity and the sound insulating property of the laminated glass are further enhanced.

The interlayer film may be an interlayer film having a uniform thickness, and may be an interlayer film having varying thickness. The sectional shape of the interlayer film may be a rectangular shape and may be a wedge-like shape. The interlayer film may be wound, and the interlayer film may be made into a roll body.

The production method of the interlayer film according to the present invention is not particularly limited. In the case of a single-layered interlayer film, examples of the production method of the interlayer film according to the present invention include a method of extruding a resin composition with an extruder. In the case of a multi-layered interlayer film, examples of the production method of the interlayer film according to the present invention include a method of separately forming resin compositions used for constituting respective layers into respective layers, and then, for example, layering the obtained layers, a method of coextruding resin compositions used for constituting respective layers with an extruder and layering the layers, and the like. A production method of extrusion-molding is preferred because the method is suitable for continuous production.

It is preferred that the second layer and the third layer contain the same polyvinyl acetal resin. This case realizes excellent production efficiency of the interlayer film. For the reason of excellent production efficiency of the interlayer film, it is preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method. The emboss roll method is preferred because a large number of embosses of the protrusions and recesses, which is a quantitatively constant protrusion and recess pattern, can be formed.

(Laminated Glass)

FIG. 3 is a sectional view schematically showing an example of laminated glass prepared with the interlayer film for laminated glass shown in FIG. 1.

A laminated glass 31 shown in FIG. 3 includes a first lamination glass member 21, a second lamination glass member 22 and the interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of the second layer 2. The second lamination glass member 22 is layered on an outer surface 3a of a third layer 3.

FIG. 4 is a sectional view schematically showing an example of laminated glass prepared with the interlayer film for laminated glass shown in FIG. 2.

A laminated glass 31A shown in FIG. 4 includes the first lamination glass member 21, the second lamination glass member 22 and the interlayer film 11A. The interlayer film 11A is arranged between the first lamination glass member 21 and the second lamination glass member 22 to be sandwiched therebetween.

The first lamination glass member 21 is layered on the first surface 11a of the interlayer film 11A. The second lamination glass member 22 is layered on the second surface 11b opposite to the first surface 11a of the interlayer film 11A.

As described above, the laminated glass according to the present invention includes a first lamination glass member, a second lamination glass member, and an interlayer film, and the interlayer film is the interlayer film for laminated glass according to the present invention. In the laminated glass according to the present invention, the above-mentioned interlayer film is arranged between the first lamination glass member and the second lamination glass member.

It is preferred that the first lamination glass member be the first glass plate. It is preferred that the second lamination glass member be the second glass plate.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, and is preferably 5 mm or less, more preferably 3 mm or less. Moreover, when the lamination glass member is a glass plate, the thickness of the glass plate is preferably 1 mm or more, and is preferably 5 mm or less, more preferably 3 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70 to 110° C. to obtain a preliminarily press-bonded laminate. Next, by putting the preliminarily press-bonded laminate into an autoclave or by pressing the laminate, the laminate is press-bonded at about 120 to 150° C. and under a pressure of 1 to 1.5 MPa. In this way, laminated glass can be obtained. At the time of producing the laminated glass, a first layer, a second layer, and a third layer may be layered.

Each of the interlayer film and the laminated glass can be used for automobiles, railway vehicles, aircraft, ships, buildings, and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass, or roof glass of an automobile, and the like. The interlayer film and the laminated glass are suitably used for automobiles. The interlayer film is used for obtaining laminated glass of an automobile.

Hereinafter, the present invention will be described in more detail with reference to examples and comparative examples. The present invention is not limited only to these examples.

Example 1

Preparation of Composition for Forming First Layer:
The following ingredients were mixed, and kneaded sufficiently with a mixing roll to obtain a composition for forming a first layer.
Aliphatic polyolefin ("ABSORTOMER EP-1001" available from Mitsui Chemicals, Inc.) 100 parts by weight
Paraffin oil ("Diana process oil PW-90" available from Idemitsu Kosan Co., Ltd.) 40 parts by weight
Adhesive strength adjusting agent for between layer and glass plate ("ARUFON UH-2041" available from TOAGOSEI CO., LTD.) 5 parts by weight
An amount that is 0.2% by weight in the obtained interlayer film of an ultraviolet ray screening agent (2-(2-hydroxy-3-t-butyl-5-methylphenyl)-5-chlorobenzotriazole)
An amount that is 0.2% by weight in the obtained interlayer film of an oxidation inhibitor (2,6-di-t-butyl-p-cresol)
By extruding the obtained composition for forming the first layer with an extruder, a single-layered interlayer film (thermoplastic elastomer interlayer film, thickness: 800 μm) was prepared.
Preparation of Laminated Glass (for Measuring Sound Insulating Property):
The obtained interlayer film was cut into a size of 30 cm long×2.5 cm wide. As the first lamination glass member, and the second lamination glass member, two glass plates (clear float glass, 2 mm thick, 30 cm long×2.5 cm wide) were prepared. The interlayer film was sandwiched between the two glass plates to obtain a laminate. The laminate was put into a rubber bag and the interior of the bag was degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a sheet of laminated glass.

Example 2

Preparation of Composition for Forming First Layer:
The following ingredients were mixed, and kneaded sufficiently with a mixing roll to obtain a composition for forming a first layer.
Aliphatic polyolefin ("ABSORTOMER EP-1001" available from Mitsui Chemicals, Inc.) 100 parts by weight
Paraffin oil ("Diana process oil PW-32" available from Idemitsu Kosan Co., Ltd.) 35 parts by weight.
An amount that is 0.2% by weight in the obtained interlayer film of an ultraviolet ray screening agent (2-(2-hydroxy-3-t-butyl-5-methylphenyl)-5-chlorobenzotriazole)
An amount that is 0.2% by weight in the obtained interlayer film of an oxidation inhibitor (2,6-di-t-butyl-p-cresol)
Preparation of Composition for Forming Second Layer and Third Layer:
The following ingredients were mixed, and kneaded sufficiently with a mixing roll to obtain a composition for forming a second layer and a third layer.
Polyvinyl acetal resin 1 (average polymerization degree: 1700, using n-butyl aldehyde, acetalization degree 68.5% by mole, content of hydroxyl group: 30.7% by mole, acetylation degree: 0.8% by mole) 100 parts by weight
Triethylene glycol di-2-ethylhexanoate (3GO): 37.5 parts by weight An amount that is 0.2% by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

Preparation of Interlayer Film:

By coextruding the composition for forming a first layer and a composition for forming a second layer and a third layer using a coextruder, an interlayer film (800 μm in thickness) having a layered structure with a stack of a second layer (350 μm in thickness)/a first layer (100 μm in thickness)/a third layer (350 μm in thickness) was prepared.

Laminated glass was obtained in the same manner as that in Example 1 except that the obtained interlayer film was used.

Examples 3 to 6

An interlayer film and laminated glass were obtained in the same manner as that in Example 2 except that the blending amount of the plasticizer in the first layer was set to that shown in the following Table 1.

Comparative Example 1

Preparation of Composition for Forming First Layer:

The following ingredients were mixed, and kneaded sufficiently with a mixing roll to obtain a composition for forming a first layer.

Polyvinyl acetal resin 1 (average polymerization degree: 1700, using n-butyl aldehyde, acetalization degree 68.5% by mole, content of hydroxyl group: 30.7% by mole, acetylation degree: 0.8% by mole) 100 parts by weight Triethylene glycol di-2-ethylhexanoate (3GO): 40 parts by weight An amount that is 0.2% by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

An interlayer film and laminated glass were obtained in the same manner as in Example 1 except that the obtained composition for forming a first layer was used.

Comparative Example 2

Preparation of Composition for Forming First Layer:

The following ingredients were mixed, and kneaded sufficiently with a mixing roll to obtain a composition for forming a first layer.

Polyvinyl acetal resin 2 (average polymerization degree: 3300, using n-butyl aldehyde, acetalization degree 64.0% by mole, content of hydroxyl group: 24.0% by mole, acetylation degree: 12.0% by mole) 100 parts by weight Triethylene glycol di-2-ethylhexanoate (3GO): 40 parts by weight An amount that is 0.2% by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

An interlayer film and laminated glass were obtained in the same manner as in Example 1 except that the obtained composition for forming a first layer was used.

Comparative Example 3

Preparation of Composition for Forming First Layer:

The following ingredients were mixed, and kneaded sufficiently with a mixing roll to obtain a composition for forming a first layer.

Styrenic elastomer 1 ("HYBRAR 5125" available from KURARAY CO., LTD.) 100 parts by weight Adhesive strength adjusting agent for between layer and glass plate ("Sila-Ace S310" available from NICHIBI TRADING Co., Ltd.) 0.3 parts by weight An amount that is 0.2% by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

An interlayer film and laminated glass were obtained in the same manner as in Example 1 except that the obtained composition for forming a first layer was used.

Comparative Example 4

An interlayer film and laminated glass were obtained in the same manner as in Comparative Example 3 except that the styrenic elastomer 1 ("HYBRAR 5125" available from KURARAY CO., LTD.) in the composition for forming a first layer was changed to styrenic elastomer 2 ("HYBRAR 7125" available from KURARAY CO., LTD.).

Comparative Examples 5, 6

An interlayer film and laminated glass were obtained in the same manner as that in Example 2 except that the blending amount of the plasticizer in the first layer was set to that shown in the following Table 2.

(Evaluation)

(1) Glass Transition Temperature and Tan δ

The obtained interlayer film was stored for 12 hours in an environment at room temperature of 23±2° C. and a humidity of 25±5%. Directly after storage, the interlayer film was cut into a size of 50 mm long and 20 mm wide, and measured for glass transition temperature and tan δ by using a viscoelasticity measuring apparatus "DMA+1000" available from Metravib in a shear mode from −50° C. to 100° C. at a temperature raising speed of 2° C./minute in the condition of 1 Hz frequency and 0.05% strain. Whether the glass transition temperature lies within the temperature range of −10 to 10° C. was judged. Also, a maximum value of tan δ in the temperature range of −10 to 10° C. was evaluated.

(2) Loss Factor and Sound Insulating Property

The obtained laminated glass was excited with a vibration generator for damping test ("Vibrator G21-005D" available from Shinken. Co., Ltd.). The resultant vibration characteristic was amplified with a mechanical impedance measuring device ("XG-81" available from RION Co., Ltd.), and the vibration spectrum was analyzed with a FFT spectrum analyzer ("FFT analyzer HP3582A" available from Yokogawa Hewlett Packard).

From a ratio between a loss factor obtained in this manner and a resonance frequency of the laminated glass, a graph showing the relation between the sound frequency (Hz) and the sound transmission loss (dB) at 10° C., 20° C. and 50° C. was prepared, and the minimal sound transmission loss (TL value) at a sound frequency around 3,000 Hz was determined. The higher the TL value, the more the sound insulating property enhances. The sound insulating property was judged according to the following criteria.

[Criteria for Judgment in Sound Insulating Property]
○: TL value is 35 dB or more
Δ: TL value is 30 dB or more and less than 35 dB
x: TL value is less than 30 dB The details and the results are shown in the following Tables 1, 2. In this connection, in the following Tables 1, 2, the description of ingredients to be blended other than the thermoplastic resin, the plasticizer and the adhesive strength adjusting agent was omitted.

TABLE 1

|  |  |  | Example 1 | Example 2 | Example 3 | Example 4 | Example 5 | Example 6 |
|---|---|---|---|---|---|---|---|---|
|  | Second layer | Thickness (μm) |  | 350 | 350 | 350 | 350 | 350 |
|  |  | Kind of thermoplastic resin |  | Polyvinyl acetal resin 1 | Polyvinyl acetal resin 1 | Polyvinyl acetal resin 1 | Polyvinyl acetal resin 1 | Polyvinyl acetal resin 1 |
|  |  | Blending amount of thermoplastic resin (parts by weight) |  | 100 | 100 | 100 | 100 | 100 |
|  |  | Kind of plasticizer |  | 3GO | 3GO | 3GO | 3GO | 3GO |
|  |  | Blending amount of plasticizer (parts by weight) |  | 37.5 | 37.5 | 37.5 | 37.5 | 37.5 |
|  | First layer | Thickness (μm) | 800 | 100 | 100 | 100 | 100 | 100 |
|  |  | Kind of thermoplastic resin | Aliphatic polyolefin | Aliphatic polyolefin | Aliphatic polyolefin | Aliphatic polyolefin | Aliphatic polyolefin | Aliphatic polyolefin |
|  |  | Blending amount of thermoplastic resin (parts by weight) | 100 | 100 | 100 | 100 | 100 | 100 |
|  |  | Kind of plasticizer | Diana process oil PW-90 | Diana process oil PW-32 | Diana process oil PW-32 | Diana process oil PW-32 | Diana process oil PW-32 | Diana process oil PW-32 |
|  |  | Blending amount of plasticizer (parts by weight) | 40 | 35 | 20 | 25 | 30 | 40 |
|  |  | Kind of adhesive strength adjusting agent | ARUFON UH-2041 | — | — | — | — | — |
|  |  | Blending amount of adhesive strength adjusting agent (parts by weight) | 5 | — | — | — | — | — |
|  | Third layer | Thickness (μm) |  | 350 | 350 | 350 | 350 | 350 |
|  |  | Kind of thermoplastic resin |  | Polyvinyl acetal resin 1 | Polyvinyl acetal resin 1 | Polyvinyl acetal resin 1 | Polyvinyl acetal resin 1 | Polyvinyl acetal resin 1 |
|  |  | Blending amount of thermoplastic resin (parts by weight) |  | 100 | 100 | 100 | 100 | 100 |
|  |  | Kind of plasticizer |  | 3GO | 3GO | 3GO | 3GO | 3GO |
|  |  | Blending amount of plasticizer (parts by weight) |  | 37.5 | 37.5 | 37.5 | 37.5 | 37.5 |
| Evaluation |  | Presence or absence of glass transition temperature of first layer in temperature range of −10° C. to 10° C. | Presence | Presence | Presence | Presence | Presence | Presence |
|  |  | Glass transition temperature of first layer (° C.) | 1.6 | −4.4 | 6.6 | 3.5 | 0 | −8.1 |
|  |  | Maximum value of tanδ of first layer in temperature range of −10° C. to 10° C. | 2.9 | 3.1 | 3.4 | 3.3 | 3.2 | 3 |
|  |  | Loss factor at 20° C. | 0.523 | 0.394 | 0.363 | 0.403 | 0.424 | 0.363 |
|  |  | Sound insulating property | ○ | ○ | ○ | ○ | ○ | ○ |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  | Second layer | Thickness (μm) |  |  |  |  | 350 | 350 |
|  |  | Kind of thermoplastic resin |  |  |  |  | Polyvinyl acetal resin 1 | Polyvinyl acetal resin 1 |
|  |  | Blending amount of thermoplastic resin (parts by weight) |  |  |  |  | 100 | 100 |
|  |  | Kind of plasticizer |  |  |  |  | 3GO | 3GO |
|  |  | Blending amount of plasticizer (parts by weight) |  |  |  |  | 37.5 | 37.5 |
|  | First layer | Thickness (μm) | 800 | 800 | 800 | 800 | 100 | 100 |
|  |  | Kind of thermoplastic resin | Polyvinyl acetal resin 1 | Polyvinyl acetal resin 2 | Styrenic elastomer 1 | Styrenic elastomer 2 | Aliphatic polyolefin | Aliphatic polyolefin |

TABLE 2-continued

|  |  | Comparative Example 1 | Comparative Example 2 | Comparative Example 3 | Comparative Example 4 | Comparative Example 5 | Comparative Example 6 |
|---|---|---|---|---|---|---|---|
|  | Blending amount of thermoplastic resin (parts by weight) | 100 | 100 | 100 | 100 | 100 | 100 |
|  | Kind of plasticizer | 3GO | 3GO | — | — | Diana process oil PW-32 | Diana process oil PW-32 |
|  | Blending amount of plasticizer (parts by weight) | 40 | 40 | — | — | 50 | 15 |
|  | Kind of adhesive strength adjusting agent | — | — | Sila-Ace S310 | Sila-Ace S310 | — | — |
|  | Blending amount of adhesive strength adjusting agent (parts by weight) | — | — | 0.3 | 0.3 | — | — |
| Third layer | Thickness (μm) |  |  |  |  | 350 | 350 |
|  | Kind of thermoplastic resin |  |  |  |  | Polyvinyl acetal resin 1 | Polyvinyl acetal resin 1 |
|  | Blending amount of thermoplastic resin (parts by weight) |  |  |  |  | 100 | 100 |
|  | Kind of plasticizer |  |  |  |  | 3GO | 3GO |
|  | Blending amount of plasticizer (parts by weight) |  |  |  |  | 37.5 | 37.5 |
| Evaluation | Presence or absence of glass transition temperature of first layer in temperature range of −10° to 10° C. | Absence | Absence | Presence | Presence | Absence | Absence |
|  | Glass transition temperature of first layer (° C.) | 27.7 | 15.5 | −4.5 | −4.5 | −14.5 | 12 |
|  | Maximum value of tanδ of first layer in temperature range of −10° C. to 10° C. | 0.3 | 1.3 | 1.9 | 1.7 | 1.8 | 3.0 |
|  | Loss factor at 20° C. | 0.026 | 0.163 | 0.346 | 0.349 | 0.310 | 0.308 |
|  | Sound insulating property | x | Δ | Δ | Δ | Δ | Δ |

EXPLANATION OF SYMBOLS

1: First layer
1a: First surface
1b: Second surface
2: Second layer
2a: Outer surface
3: Third layer
3a: Outer surface
11: Interlayer film
11A: Interlayer film (first layer)
11a: First surface
11b: Second surface
21: First lamination glass member
22: Second lamination glass member
31: Laminated glass
31A: Laminated glass

The invention claimed is:

1. An interlayer film for laminated glass having a one-layer structure or a two or more-layer structure,
the interlayer film including a thermoplastic elastomer layer containing a thermoplastic elastomer and a plasticizer,
the thermoplastic elastomer being an aliphatic polyolefin,
the thermoplastic elastomer layer having a glass transition temperature in a temperature range of −10° C. to 10° C., a maximum value of tan δ in a temperature range of −10° C. to 10° C. of the thermoplastic elastomer layer being 1.5 or more, and
a content of the plasticizer in the thermoplastic elastomer layer being 20 parts by weight or more and 40 parts by weight or less relative to 100 parts by weight of the thermoplastic elastomer in the thermoplastic elastomer layer.

2. The interlayer film for laminated glass according to claim 1, wherein the aliphatic polyolefin is a saturated aliphatic polyolefin.

3. The interlayer film for laminated glass according to claim 1, wherein the plasticizer is a plasticizer other than an organic ester plasticizer.

4. The interlayer film for laminated glass according to claim 1, wherein the plasticizer is paraffin oil.

5. The interlayer film for laminated glass according to claim 1, comprising:
a first layer; and
a second layer arranged on a first surface side of the first layer;
the first layer being the thermoplastic elastomer layer.

6. The interlayer film for laminated glass according to claim 5, further comprising a third layer arranged on a second surface side opposite to the first surface side of the first layer.

7. The interlayer film for laminated glass according to claim 6, wherein
the second layer contains a thermoplastic resin and a plasticizer, and
the third layer contains a thermoplastic resin and a plasticizer.

8. A laminated glass comprising:
a first lamination glass member;
a second lamination glass member; and
the interlayer film for laminated glass according to claim 1, the interlayer film for laminated glass being arranged between the first lamination glass member and the second lamination glass member.

9. The interlayer film for laminated glass according to claim 1, further comprising an ultraviolet ray screening agent, the ultraviolet ray screening agent comprising a metal oxide coated with one selected from the group consisting of an insulating metal oxide, a hydrolysable organosilicon compound, and a silicone compound.

10. The interlayer film for laminated glass according to claim 1, further comprising a lame retardant.

* * * * *